United States Patent Office 3,696,048
Patented Oct. 3, 1972

3,696,048
CORROSION INHIBITING COMPOSITION AND
USE THEREOF
Rudolf H. Hausler, Arlington Heights, and Leonard A. Goeller, Des Plaines, Ill., assignors to Universal Oil Products Company, Des Plaines, Ill.
No Drawing. Filed Apr. 6, 1970, Ser. No. 26,077
Int. Cl. C23f 11/00
U.S. Cl. 252—392                                          9 Claims

ABSTRACT OF THE DISCLOSURE

A corrosion inhibiting composition of (1) a salt of dicarboxylic acid and aliphatic amine and (2) a solvating compound containing at least one hydroxyl. The composition is incorporated in any substrate which contacts metal and serves to inhibit corrosion of the metal.

BACKGROUND OF THE INVENTION

In the manufacture, handling, transportation and/or use of various organic substances, corrosion problems occur due to the presence of corrosive materials, including one or more of oxygen, hydrogen sulfide, carbon dioxide, 2 to 4 carbon atom carboxylic acids, hydrogen halide, halogen salts as sodium chloride, ammonium chloride, etc. or mixtures thereof, as well as the presence of water in solution or in suspension in the organic substances. Illustrative organic substances include particularly hydrocarbon distillates as gasoline, jet fuel, kerosene, lubricating oil, fuel oil, diesel oil, crude oil, etc. Other specific oils include cutting oils, soluble oils, slushing oils, rolling oils, etc. which may be of mineral, animal or vegetable origin. Other organic substances include various coating compositions as grease, wax, household oil, paints, lacquer, etc. Still other organic substances include alcohols, ketones, esters, ethers, dioxane, amino compounds, amides, etc. In spite of all reasonable and practical precautions which are taken to avoid the presence of water, an appreciable quantity of water separation is found as a film or in minute droplets in the pipe line or on container walls or even in small pools at the bottom of the container. This results in corrosion of the metal surfaces and contamination of the organic substance by the corrosion products. In addition to the corrosion described above, corrosion also is encountered in various types of oil wells, including drilling equipment, auxiliary field equipment such as flow lines, separators, tanks, etc., as well as ballast tanks on submersible drilling barges, marine vessels, etc. Corrosion also is encountered in processing equipment including piping, reactors, pumps, heat exchangers, storage tanks, etc.

A myriad of corrosion inhibitors has been proposed heretofore. One class includes various amines, various reaction products of amines, including salts of amines and carboxylic acids, reaction products of amines with epihalohydrin compounds, etc. While many of the prior art inhibitors are very effective for the purpose, there still is a need to even further improve the effectiveness and also the desire to accomplish satisfactory corrosion inhibition with lower amounts of the inhibitor and thus effect economy in this art.

DESCRIPTION OF THE INVENTION

It now has been found that the corrosion inhibiting properties may be enhanced by utilizing a particular mixture of certain additives. As will be demonstrated in the appended examples, corrosion inhibition is obtained with considerably lower amounts of the mixture than otherwise would be required. Accordingly the desired inhibition is accomplished at a considerable savings in cost.

The improved corrosion inhibition is obtained through a mutually related and interdependent coaction between the two components of the mixture. The exact mechanism for these improved results is not fully understood but, after discovery of these improved results, the theory may be advanced that one component of the mixture, which may or may not possess corrosion inhibition potency, serves to act upon, influence or otherwise modify the other component which does possess corrosion inhibiting properties. This action may be chemical, physical or a mixture thereof. The influencing compound is referred to herein as a solvating compound and, as mentioned above, may function by chemically reacting, by physical extraction or by a mixture of both phenomena. It is believed that the solvating compound serves to extract the other component from the hydrocarbon phase and to carry the other component or resulting chemical reaction product into contact with the metal surfaces, at which point both components of the composition apparently mutually coact to protect the metal surface from corrosion. Regardless of the reasons therefor, the mixture of the present invention does result in improved corrosion inhibition and applicants do not wish to be limited to the explanation offered above.

In one embodiment the present invention relates to a corrosion inhibiting composition of (1) from about 50% to about 98% by weight of a salt of a 10–50 carbon atom dicarboxylic acid and a 10–30 carbon atom aliphatic amine and (2) from about 2% to about 50% by weight of a solvating compound containing at least one hydroxyl and serving to extract said salt from a substrate and to carry the same into contact with a metal surface.

Referring to the embodiment set forth above, it is understood that the salt is extracted in the case of physical removal and the solvated compound or complex is extracted in the case of chemical reaction, or a mixture of these may occur. As also hereinbefore set forth, the exact mechanism is not fully understood and therefore applicants do not wish to be limited to any particular mechanism for these improved results.

As hereinbefore set forth, one component of the composition is a salt of a dicarboxylic acid and an amine. Any suitable dicarboxylic acid may be used and contains from 10 to 50 and preferably from 20 to 40 carbon atoms per molecule. A number of dicarboxylic acids are available commercially, generally as a mixed byproduct and accordingly marketed at a lower cost. One such dicarboxylic acid is marketed under the trade name of "VR–1 Acid." This acid is a mixture of polybasic acids, predominantly dicarboxylic acids, and has an average molecular weight of about 750. Another mixed byproduct acid is marketed commercially under the trade name of "Dimer Acid." Still another such acid is marketed under the trade name of "D–50–MEX" acid.

Still another mixed byproduct acid is marketed commercially under the trade name of "Empol 222." This dimer acid is a dilinoleic acid and is represented by the following general formula:

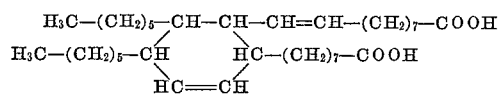

This acid is a viscous liquid, having an apparent molecular weight of approximately 600. It has an acid value of 180–192, an iodine value of 80–95, a saponification value of 185–195, a neutralization equivalent of 290–310, a refractive index at 25° C. of 1.4919, a specific gravity at 15.5° C./15.5° C. of 0.95, a flash point of 530° F., a fire point of 600° F., and a viscosity at 100° C. of 100 centistokes.

Other dicarboxylic acids include alkyl dicarboxylic acids in which the alkyl contains at least 10 carbon atoms per molecule and thus may comprise alkyl malonic acid, alkyl succinic acid, alkyl glutaric acid, alkyl adipic acid, alkyl pimelic acid, alkyl suberic acid, alkyl azelaic acid, alkyl sebacic acid, alkyl phthalic acid, and higher molecular weight dicarboxylic acids. It is understood that a mixture of acids may be employed.

Any suitable aliphatic amine meeting the requirements hereinbefore set forth may be used in preparing the salt. The amine contains from 10 to 30 and preferably 12 to 20 carbon atoms per molecule. The amine may be a primary aliphatic amine and thus will be selected from decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, as well as the corresponding alkenyl amines. Conveniently these long chain amines are prepared from fatty acids, the amines being referred to herein as fatty amines, and thus include lauryl amine, myristyl amine, palmityl amine, stearyl amine, arachidyl amine, palmitolyl amine, oleyl amine, ricinoleyl amine, linoleyl amine, linolenyl amine, etc.

Mixtures of fatty amines are available commercially under various trade names including "Alamine H26D" and "Armeen HTD." These products comprise mixtures predominating in alkyl amines containing 16 to 18 carbon atoms per alkyl group, although they contain a small amount of alkyl groups having 14 carbon atoms. Other mixed fatty amines include tallow amine, coco amine, palm amine, etc., as well as hydrogenated products thereof.

In another embodiment the amine is an N-aliphatic-diaminoalkane having an aliphatic group of at least 8 and preferably of at least 10 carbon atoms. A particularly preferred N-alkyl-diaminoalkane is an N-alkyl-1,3-diaminopropane including, for example, N-decyl-1,3-diaminopropane,
N-undecyl-1,3-diaminopropane,
N-dodecyl-1,3-diaminopropane,
N-tridecyl-1,3-diaminopropane,
N-tetradecyl-1,3-diaminopropane,
N-pentadecyl-1,3-diaminopropane,
N-hexadecyl-1,3-diaminopropane,
N-heptadecyl-1,3-diaminopropane,
N-octadecyl-1,3-diaminopropane,
N-nonadecyl-1,3-diaminopropane,
N-eicosyl-1,3-diaminopropane,
N-heneicosyl-1,3-diaminopropane,
N-docosyl-1,3-diaminopropane,
N-tricosyl-1,3-diaminopropane,
N-tetracosyl-1,3-diaminopropane,
N-pentacosyl-1,3-diaminopropane,
N-hexacosyl-1,3-diaminopropane and
N-heptacosyl-1,3-diaminopropane.

Here again the aliphatic group conveniently is derived from fatty acids and thus the aliphatic group includes lauryl, myristyl, palmityl, stearyl, arachidyl, palmitolyl, oleyl, ricinoleyl, linoleyl, linolenyl, etc. A number of N-alkyl-1,3-diaminopropanes are available commercially as mixtures and generally at a lower cost. One such mixture is available commercially under the trade name of "Duomeen T" in which the alkyl substituents contain from about 12 to about 20 carbon atoms per group and mostly 16 to 18 carbon atoms. Another mixture is available as "Diam 26." Still another commercially available mixture is "Duomeen O" and comprises N-oleyl-1,3-diaminopropane. Another N-aliphatic-1,3-diaminopropane is "Duomeen LPS" in which the aliphatic group is derived from phenyl stearic acid. This is a mixed acid in which the phenyl group is positioned on either the 9 or 10 carbon atom of the stearyl chain.

It is understood that the particular dicarboxylic acid and the particular amine will be selected with reference to the particular substrate in which the final inhibitor composition is to be used. For example, when used in a hydrocarbon oil, the number of carbon atoms in the dicarboxylic acid and in the amine will be selected so that the salt is readily soluble in the hydrocarbon oil.

The salt is prepared in any suitable manner and is readily prepared by mixing the acid and amine at ambient temperature, preferably with vigorous stirring. When desired, a slightly elevated temperature, which usually will not exceed 200° F., may be employed but excessive temperature should not be used in order to avoid the undesired formation of amides or other reaction products. In a preferred embodiment the acid salt is prepared and this is accomplished by utilizing an excess of carboxylic acid groups in relation to the amino groups as for example, from about 1.2 to about 3 equivalents of acid per 1 equivalent of amine. When the neutral salt is desired, stoichiometric amounts of the acid and amine will be used. When the basic salt is desired, from about 1.2 to about 3 equivalents of amine are used per 1 equivalent of carboxylic acid. When desired, a solvent is utilized, either in forming a more fluid mixture of the acid and/or amine before mixing or during the mixing thereof. Detailed information as to the preparation of a number of such salts is contained in U.S. Pats. 2,868,628 and 3,003,955 and such details are incorporated by reference into the present specifications.

When prepared, the salt may be utilized as such or may be prepared as a solution in a suitable solvent, for subsequent blending with the other component of the composition. The salt may comprise from about 25% to about 75% by weight of the solution. Any suitable solvent may be used and preferably comprises an aromatic hydrocarbon, including benzene, toluene, xylene, ethylbenzene, diethylbenzene, cumene, etc. or a paraffinic hydrocarbon including hexane, heptane, octane, nonane, decane, undecane, dodecane, etc. but preferably comprises a mixture such as naphtha, kerosene, fuel oil, etc. or an aromatic mixture as, for example, an aromatic residue product. These mixed products generally are available at lower cost and appear to satisfactorily serve as solvent.

As hereinbefore set forth, another component of the inhibitor composition of the present invention is referred to as a solvating compound containing at least one hydroxyl. Any suitable solvating compound may be used in accordance with the present invention.

In a preferred embodiment the solvating component is an oxyalkylenated phenol and still more particularly an oxyalkylenated alkylphenol. The alkyl component of the resulting oxyalkyl moiety preferably contains from 1 to 6 and still more particularly from 2 to 4 carbon atoms. Thus preferred oxyalkyl groups comprise oxyethyl, oxypropyl and oxybutyl. The number of oxyalkyl groups may range from 1 to 20 and preferably from 5 to 15 oxyalkyl groups for each phenolic group. The alkyl group of the alkylphenol may contain from 1 to 20 and preferably from 5 to 15 carbon atoms. Accordingly preferred solvating compounds comprise oxyethylenated pentylphenol, oxyethylenated hexylphenol, oxyethanated heptylphenol, oxyethylenated octylphenol, oxyethylenated nonylphenol, oxyethylenated decylphenol, oxyethylenated undecylphenol, oxyethylenated dodecylphenol, oxyethylenated tridecylphenol, oxyethylenated tetradecyl phenol and oxyethylenated pentadecylphenol, the alkyl group preferably being in the para position, although it may be in the ortho or meta position. As hereinbefore set forth, the number of oxyethyl groups will be within the range of from 1 to 20 and preferably from 5 to 15. A number of oxyalkylenated alkylphenols are available commercially. One such compound is available under the trade name of "MAKON 10" and comprises oxyethylenated nonylphenol containing an average of 10 oxyethyl groups.

Other oxyalkylenated alkylphenols include oxypropylenated pentylphenol, oxypropylenated hexylphenol, oxypropylenated heptylphenol, oxypropylenated octylphenol, oxypropylenated nonylphenol, oxypropylenated decylphenol, oxypropylenated undecylphenol, oxypropylenated dodecylphenol, oxypropylenated tridecylphenol, oxypropylenated tetradecylphenol, oxypropylenated pentadecylphenol, oxybutylenated pentylphenol, oxybutylenated hexylphenol, oxybutylenated heptylphenol, oxybutylenated octylphenol, oxybutylenated nonylphenol, oxybutylenated decylphenol, oxybutylenated undecylphenol, oxybutylenated dodecylphenol, oxybutylenated tridecylphenol, oxybutylenated tetradecylphenol, oxybutylenated pentadecylphenol, etc. Here again the number of oxyalkylene groups will be within the range of from 1 to 20 and preferably from 5 to 15. Also, the alkyl group preferably is in the para position although it may be in the ortho or meta position.

In still another embodiment the solvating compound is an oxyalkylenated dialkyl phenol in which the alkyl groups each contain from 1 to 20 and preferably from 5 to 15 carbon atoms and, in another embodiment, one alkyl group may contain 1 to 4 carbon atoms and other alkyl groups may contain from 5 to 20 carbon atoms. The alkyl groups may be in the 2,3-positions, 2,4-positions, 2,5- positions, 2,6- positions, 3,4- positions or 3,5- positions. In still another embodiment the solvating compound may be an oxyalkylenated trialkylphenol in which the alkyls are selected from those hereinbefore set forth and preferably are in the 2,4,6- positions although they may be in the 2,3,4- or 2,3,5- positions.

In another embodiment the solvating compound comprises an alcohol, which may contain from 1 to 30 and preferably from 6 to 26 carbon atoms per molecule. Conveniently the alcohol comprises a fatty alcohol including, for example, capryl alcohol, lauryl alcohol, myristyl alcohol, palmityl alcohol, stearyl alcohol, palmitoleyl alcohol, oleyl alcohol, etc. and mixtures thereof. In another embodiment the alcohol is an oxyalkylenated aliphatic alcohol in which the oxyalkyl group contains from 1 to 6 and preferably fro m2 to 4 carbon atoms and the oxyalkylenated compound contains from 1 to 20 and preferably from 5 to 15 oxyalkyl groups.

In still another embodiment the solvating component comprises a polyhydroxy compound including glycols, glycerols, etc. Illustrative glycols include ethylene glycol, propylene glycol, butylene glycol, trimethylene glycol, tetramethyene glycol, pentamethylene glycol, hexamethylene glycol, etc. Illustrative glycerols include glycerol, erythritol, pentaerythritol, etc. In still another embodiment the polyhydroxy compound is an oxyalkenated derivative. Here again each oxyalkyl contains from 1 to 6 and preferably 2 to 4 carbon atoms and the number of oxyalkyl groups may range from 1 to 20.

In still another embodiment the solvating compound is an oxyalkylenated amine. The amine may be an aliphatic amine, aromatic amine or cycloalkyl amine and may be either a monoamine or a polyamine. The amine preferably contains from 5 to 30 carbon atoms. Illustrative primary aliphatic amines include pentyl amine, hexyl amine, heptyl amine, octyl amine, nonyl amine, decyl amine, undecyl amine, dodecyl amine, tridecyl amine, pentadecyl amine, hexadecyl amine, heptadecyl amine, octadecyl amine, nonadecyl amine, eicosyl amine, etc. Here again the long chain amines conveniently are derived from the corresponding fatty acids and are referred to here as fatty amines. Aliphatic polyamines include alkylene diamine, dialkylene triamine, trialkylene tetramine, tetraalkylene pentamine in which the alkylene moiety contains from 2 to 6 and preferably 2 to 4 carbon atoms each and also including these polyamines in which a nitrogen atom contains an alkyl substituent of from 1 to 30 carbon atoms, as illustrated, for example, by N-tallow-1,3-diaminopropane, N - coco - 1,3 - diaminopropane, etc. or the hydrogenated derivative thereof. As hereinbefore set forth the oxyalkylenated compound may contain from 1 to 20 oxyalkyl groups.

As hereinbefore set forth in one embodiment the solvating compound is prepared by oxyalkylenation utilizing an alkylene oxide as a reactant. In still another embodiment epichlorohydrin or other epihalohydrin compound is utilized in preparing the desired hydroxyl-containing compound. A specific illustration of such a compound is prepared by the reaction of epichlorohydrin and an aliphatic amine. Detailed information on the preparation of some of these reaction products, including the use of other epihalohydrin reactants, are described in U.S. Pat. 3,189,652. The use of such reaction products as solvating compounds is the subject of a separate application for patent.

In still another embodiment the solvating compound is an acid and preferably a carboxylic acid containing from 5 to 30 carbon atoms per molecule. Here again, the acid conveniently comprises a fatty acid and thus may be selected from caprylic acid, capric acid, lauric acid, myristic acid, palmitic acid, stearic acid, arachidic acid, behenic acid, cerotic acid, palmitoleic acid, oleic acid, ricinoleic acid, linoleic acid, gadoleic acid, cetoleic acid, etc. It is understood that any suitable acid or mixture of acids may be used.

In still another embodiment the solvating compound is a partial ester of a polyhydroxy compound. While any suitable carboxylic acid may be used in preparing the ester and may be mono- or polycarboxylic, here again the acid conveniently is a fatty acid and preferably is selected from those hereinbefore set forth. Any suitable polyhydroxy compound may be used, including glycols, glycerols, carbohydrates, etc. A number of partial esters is available commercially and conveniently is used in the present invention. Illustrative esters include sorbitan fatty acid esters such as sorbitan mono-, di- or tri- fatty acid esters including sorbitan monooleate, sorbitan trioleate, sorbitan monostearate, sorbitan monopalmitate, etc. Other commercially available partial esters include ethylene glycol fatty acid esters, diethylene glycol fatty acid esters including specifically diethylene glycol monostearate, diethylene glycol monolaurate, tetraethylene glycol monostearate, propylene glycol fatty acid esters including specifically propylene glycol monolaurate, propylene glycol monostearate, etc., glycerol fatty acid esters including specifically glycerol monostearate. As hereinbefore set forth the specific partial esters mentioned above are illustrative of commercially available esters but it is understood that other suitable partial esters may be used in the present invention.

In still another embodiment the solvating compound is an oxyalkylenated partial ester of a polyhydroxy compound. Illustrative partial esters are set forth above and the oxyalkylenation is effected in substantially the same manner as hereinbefore described. Here again the number of oxyalkylene groups will comprise from 1 to 20. Also, it is understood that mixed esters may be oxyalkylenated to produce a mixture of polyoxyalkylenated esters.

In still another embodiment the solvating compound is an oxyalkylenated carboxylic acid and particularly an oxyalkylenated fatty acid. Here again the number of oxyalkylene groups will be in the range of from 1 to 20 and the oxyalkylenation may be effected in the manner hereinbefore set forth. A number of oxyalkylenated fatty acids is available commercially and includes polyoxyethylenated fatty acids and specifically polyoxyethylenated oleic acid, polyoxyethylenated stearic acid, polyoxyethylenated palmitic acid, polyoxypropylenated fatty acids, including specifically polyoxypropylenated stearic acid, polyoxypropylenated oleic acid, as well as mixed polyoxyalkylenated fatty acids as, for example, polyoxyethylenated oxypropylene oleic acid and the like.

From the hereinbefore description it will be seen that any suitable solvating compound containing at least one hydroxyl may be used in admixture with the salt to provide a composition of improved corrosion inhibiting properties. The solvating compound may be recovered in admixture with a solvent when used in the preparation thereof or may be formed as a solution in a suitable solvent for ease in handling and mixing. The salt and solvating compounds are commingled in a proportion of from about 50% to about 98% by weight of the salt and from 2% to about 50% by weight of the solvating compound. In a particularly preferred embodiment the salt is in a proportion of from about 90% to about 98% by weight and the solvating compound is in a proportion of from about 2% to about 10% by weight. The weight percents used in the present specification and claims are on the basis of active ingredients and do not include solvents or other components included in the inhibitor composition.

While the salt and the solvating compound may be added separately in the prescribed proportions to the organic substrate, it is preferred to form a blend of the salt and the solvating compound and to incorporate the blend into the organic substrate. When desired, the inhibitor composition may also contain one or more other ingredients as, for example, a metal deactivator, such as disalicylal diaminopropane, ethylenediamine tetra-acetic acid, etc., antioxidants which generally are of the phenolic or amine type, or other additives which normally are incorporated in the substrate. For ease in handling, the final inhibitor composition preferably is prepared as a solution in a suitable solvent, the solvent preferably being selected from those hereinbefore set forth, and conveniently comprises all or a part of the solvent or solvents originally contained in the salt, solvating compound and other components of the final composition.

It is an important advantage of the present invention that the inhibitor composition is utilized in a comparatively low concentration which, as hereinbefore set forth, will be lower than otherwise required. The concentration of the inhibitor composition, based on active ingredients, may be within the range of from 1 to 50 p.p.m. (parts per million) of the substrate, although higher concentrations up to 1000 p.p.m. may be employed in special situations encountering excessive corrosion.

As hereinbefore set forth the inhibitor composition of the present invention is used in any substrate which contacts metal and corrosion of the metal is encountered. In one embodiment the inhibitor composition is incorporated in a hydrocarbon substrate and will be added to the substrate in the desired concentration, preferably accompanied by some form of mixing in order to obtain uniform distribution of the inhibitor composition, such as for example by the use of a mixing device, pumping of the mixture, recirculation out of and back into a vessel, or in any other suitable manner.

The following examples are introduced to illustrate further the novelty and utility of the present invention but not with the intention of unduly limiting the same.

EXAMPLE I

The salt of this example was prepared by intimately mixing, at slightly elevated temperature, two equivalents of "D-50-MEX" acid and one equivalent of oleyl amine. As hereinbefore set forth, the acid is a mixture of polybasic acids and predominates in dicarboxylic acids. The resultant salt is prepared as a 60% by weight solution in a heavy catalytic naphtha.

EXAMPLE II

Another salt is prepared in substantially the same manner as described in Example I except that the amine used in this example is "Duomeen T" which, as hereinbefore set forth, is N-alkyl-1,3-diaminopropane predominating in alkyl groups containing 16 to 20 carbon atoms. It will be noted that, in Example I, the amine reactant is a monoamine, whereas the amine in this example is a diamine. The salt is prepared as a 30% solution in heavy catalytic naphtha.

EXAMPLE III

An inhibitor composition is prepared to comprise 95% by weight of the salt prepared as described in Example I and 5% by weight of "MAKON 10." As hereinbefore set forth "MAKON 10" is ethoxylated nonylphenol containing an average of 10 oxyethylene groups.

EXAMPLE IV

An inhibitor composition is prepared to comprise 90% by weight of the salt prepared as described in Example II and 10% by weight of "MAKON 10."

EXAMPLE V

An inhibitor composition is prepared to comprise (1) 80% by weight of a salt prepared by reacting 2 equivalents of "VR-1 Acid" and 1 equivalent of tallow amine and (2) 20% by weight of oxypropyleneated dodecyl alcohol containing an average of 12 oxypropylene groups.

EXAMPLE VI

The corrosion inhibition properties of the mixture of the present invention was determined in a corrosion testing apparatus developed by one of the present applicants and is the subject of a separate application in his name. No novelty is claimed in the present application for the method and apparatus used in these determinations. In general, the method entails preparing a mixture of toluene and water containing 0.0056 N ammonium chloride solution. This mixture, together with 1 atmosphere of hydrogen sulfide, is recirculated over 2 mil thick steel probes. The apparatus provides for measuring the electrical current passing through the probe during the test. While maintaining a constant electrical potential the current measurement is recorded graphically. The decrease in current is directly proportional to the increase in total corrosion. Accordingly, by determining the rate of change in current, the corrosion rate, expressed as m.p.y. (mils per year), is determined.

The base current rate (no inhibitor added) averaged approximately 200 m.p.y. When evaluated in the above manner, the salt prepared as described in Example I, in a total concentration of 3 p.p.m., served to reduce the corrosion rate from an initial of about 200 m.p.y. down to 7 m.p.y., thus showing 97% protection. In another evaluation using a total concentration of 1.5 p.p.m. of the inhibitor composition prepared as described in Example III, the corrosion rate was reduced from about 200 m.p.y. down to 1 m.p.y., thus showing approximately 100% protection against corrosion. It will be seen that the use of one-half of the total amount of additive served to accomplish even greater corrosion protection than obtained when using twice as much of the salt alone. This is especially surprising in view of the fact that the ethoxylated nonylphenol by itself apparently possesses no inhibitor corrosion potency. Thus, as hereinbefore set forth, the improved results follow from a mutually related and interdependent coaction between the two components of the mixture.

EXAMPLE VII

The inhibitor composition prepared as described in Example IV is incorporated into fuel oil being transported via pipe line and serves to retard corrosion of the metal surfaces.

EXAMPLE VIII

The inhibitor composition prepared as described in Example V is incorporated into a kerosene steam being pumped into a storage tank and serves to inhibit corrosion of the piping and tank equipment.

EXAMPLE IX

The inhibitor composition prepared as described in Example III is introduced into the overhead line of a crude column and serves to inhibit corrosion of the piping and subsequent heat exchangers, coolers, and receivers.

EXAMPLE X

The inhibitor composition prepared as described in Example IV is incorporated into gasoline and serves to inhibit corrosion of metal parts contacted by the gasoline.

We claim as our invention:

1. A corrosion inhibiting composition of (1) from about 50% to about 98% by weight of a salt of a 10–50 carbon atom dicarboxylic acid and a 10–30 carbon atom hydrocarbon amine wherein said hydrocarbon substituent is selected from the group consisting of paraffinic and olefinic hydrocarbons and (2) from about 2% to about 50% by weight of an oxyalkylenated alkylphenol wherein there are from 5 to 15 oxyalkyl groups, said oxyalkyl groups containing from 1 to 6 carbon atoms, and wherein the alkyl group of the alkylphenol contains from 5 to 15 carbon atoms.

2. The composition of claim 1 in which the salt is in a concentration of from about 90% to about 98% by weight and the solvating compound is in a concentration of from about 2% to about 10% by weight.

3. The composition of claim 1 in which said dicarboxylic acid is a mixed acid containing from about 20 to about 40 carbon atoms per molecule.

4. The composition of claim 1 in which said amine is a mixture of fatty amines predominating in hydrocarbon substituent of from 12 to 20 carbon atoms per molecule.

5. The composition of claim 1 in which said amine is N-tallow-1,3-diaminopropane.

6. The composition of claim 1 in which said oxyalkylenated alkylphenol is ethoxylated nonylphenol containing an average of 10 oxyethyl groups.

7. A method of inhibiting corrosion of metallic surfaces which contact a substrate containing corrosive materials, which comprises incorporating in said substrate a corrosion inhibiting concentration of the composition of claim 1.

8. The substrate of claim 7 being hydrocarbon distillate.

9. The substrate of claim 7 being an overhead stream in a hydrocarbon refining process.

References Cited

UNITED STATES PATENTS

| | | | |
|---|---|---|---|
| 2,839,465 | 6/1958 | Jones | 252—8.55 E |
| 2,868,628 | 1/1959 | Chenicek | 44—71 X |
| 3,418,254 | 12/1968 | Bishof et al. | 21—2.7 X |
| 3,003,955 | 10/1961 | Jones | 252—8.55 E |
| 3,282,836 | 11/1966 | Miller et al. | 252—392 |

MAYER WEINBLATT, Primary Examiner

U.S. Cl. X.R.

252—8.55 E, 146, 148, 390, 396; 21—2.5, 2.7